(12) United States Patent
Contag

(10) Patent No.: US 8,534,932 B2
(45) Date of Patent: Sep. 17, 2013

(54) APPARATUS AND METHOD FOR THERMAL CONNECTION OF OPTICAL WAVEGUIDES

(75) Inventor: Karsten Contag, Munich (DE)

(73) Assignee: CCS Technology, Inc., Wilmington, DE (US)

( * ) Notice: Subject to any disclaimer, the term of this patent is extended or adjusted under 35 U.S.C. 154(b) by 154 days.

(21) Appl. No.: 13/191,054

(22) Filed: Jul. 26, 2011

(65) Prior Publication Data

US 2011/0277510 A1 Nov. 17, 2011

Related U.S. Application Data

(60) Division of application No. 12/418,690, filed on Apr. 6, 2009, now Pat. No. 8,011,835, which is a continuation of application No. PCT/EP2007/060602, filed on Oct. 5, 2007.

(30) Foreign Application Priority Data

Oct. 6, 2006 (DE) .......................... 10 2006 047 425

(51) Int. Cl.
*G02B 6/255* (2006.01)

(52) U.S. Cl.
USPC .......................................................... 385/96

(58) Field of Classification Search
None
See application file for complete search history.

(56) References Cited

U.S. PATENT DOCUMENTS

| | | | |
|---|---|---|---|
| 5,011,259 A | 4/1991 | Lieber et al. | 350/96.21 |
| 5,384,870 A | 1/1995 | Lieber | 385/15 |
| 5,570,446 A | 10/1996 | Zheng et al. | 385/98 |
| 6,230,522 B1 | 5/2001 | Ruegenberg | 65/377 |
| 6,287,020 B1 | 9/2001 | Osaka et al. | 385/96 |
| 6,428,218 B1 | 8/2002 | Mussig | 385/96 |
| 6,676,307 B1 | 1/2004 | Yang et al. | 385/96 |
| 7,494,288 B2 | 2/2009 | Ozawa et al. | 385/96 |
| 2002/0159724 A1 | 10/2002 | Oki et al. | 385/97 |
| 2003/0108307 A1 | 6/2003 | Eskildsen et al. | 385/96 |
| 2003/0172680 A1 | 9/2003 | Huang et al. | 65/377 |
| 2004/0091219 A1 | 5/2004 | Christensen et al. | 385/96 |
| 2004/0190838 A1 | 9/2004 | Bush et al. | 385/96 |
| 2005/0041939 A1 | 2/2005 | Saito et al. | 385/96 |
| 2006/0171643 A1 | 8/2006 | Hattori | 385/96 |
| 2006/0266082 A1 | 11/2006 | Bush et al. | 65/407 |

FOREIGN PATENT DOCUMENTS

| | | |
|---|---|---|
| DE | 146109 | 1/1981 |
| DE | 4236806 | 5/1994 |
| DE | 19746080 | 4/1998 |
| DE | 102004054805 | 5/2006 |
| DE | 102005038937 | 2/2007 |
| EP | 0215145 | 3/1987 |
| EP | 0864890 | 9/1998 |
| EP | 1255139 | 11/2002 |
| GB | 2420633 | 5/2006 |
| JP | 2000-275111 | 10/2000 |

OTHER PUBLICATIONS

Gibb et al., "Setting Splice Specifications for Single-Mode Fiber Cables", Corning Optical Fiber, White Paper, Aug. 2001, pp. 1-12.

*Primary Examiner* — Tina Wong

(57) ABSTRACT

A splicer comprises a positioning device, in which the fiber ends in general have a residual offset. A memory stores a predetermined relationship between the possible offset and a parameter which controls the application of heat. The parameter which controls the application of heat, for example the splicing time for a predetermined splicing current, is defined on the basis of an actual offset which can be recorded by means of cameras.

14 Claims, 3 Drawing Sheets

| Fiber offset [μm] | Welding current [s] |
|---|---|
| 0 | 3.0 |
| 1 | 3.3 |
| 2 | 3.6 |
| 3 | 4.0 |
| 4 | 4.3 |
| 5 | 4.6 |
| 6 | 4.9 |
| 7 | 5.2 |
| 8 | 5.6 |
| 9 | 5.9 |
| 10 | 6.2 |

APPARATUS AND METHOD FOR THERMAL CONNECTION OF OPTICAL WAVEGUIDES

RELATED APPLICATIONS

This application is a divisional of U.S. patent application Ser. No. 12/418,690 filed on Apr. 6, 2009 now U.S. Pat. No. 8,011,835, which is a continuation of International Application No. PCT/EP07/060602 filed Oct. 5, 2007, which claims the benefit of priority to German Application No. 102006047425.2, filed Oct. 6, 2006, all applications being incorporated herein by reference.

BACKGROUND

1. Field

The disclosure relates to the field of connection of optical waveguides. The disclosure relates in particular to an apparatus in order to connect ends of optical waveguides to one another by means of a thermal process. The disclosure also relates to a corresponding method.

2. Technical Background

Apparatus for connection of optical waveguides by means of the application of heat are generally known. In the case of splices such as these, the fiber ends of the optical waveguides to be spliced are heated, as a result of which they can be fused to one another. In this case, it is desirable for the resultant attenuation of the spliced connection to be as low as possible. A different amount of effort is required for this purpose, depending on the apparatus type, for example because the fiber ends to be spliced are aligned with respect to one another and the splicing process is matched to the circumstances resulting from the environment, in order to ensure that the attenuation, resulting from the spliced connection, for the light propagating in the fiber is as low as possible. By way of example, an arc, a corona discharge, a laser beam or a resistance wire in the form of a heating filament, for example, can be used to melt the fiber ends.

Recently, there has been a demand for splicers which can be produced at low cost and are as reliable during operation as possible, are simple to operate and require little maintenance in use while nevertheless complying with demands that are as stringent as possible for the quality of the resultant spliced connection. Apparatus such as these are used, for example, for installation of optical waveguides in buildings or for connection of the buildings by optical waveguides to the existing network. Apparatus such as these have characteristics including low weight, mechanical and electronic elements in the apparatus which are as simple and robust as possible, and as high a degree of automation as possible for the production of the spliced connection.

By way of example, WO 2007/019843 describes a splicer which uses electromechanical motors, for example stepping motors, for alignment of the fiber ends, as well as mechanical step-down conversion. The stepping motors and the step-down conversion are available at lost cost, although compromises must be accepted in the positioning accuracy of these mechanical elements. In the case of a splicer such as this, a residual offset generally remains when viewed in a direction at right angles to the longitudinal axis of the optical waveguides. Exact alignment of the fibers can be achieved only by chance, and a residual offset generally remains, because of the restricted accuracy of said positioning device, in the order of magnitude of approximately 1 micrometer ($\mu$m). In the case of apparatus such as these, the welding process is carried out with a fixed welding current and a fixed welding time. This setting was defined as being optimum just for one typical initial offset, as a result of which initial offset values which differ from this are not treated individually. In particular, no matching of the welding parameters is carried out.

Conventional splicers, for example as described in U.S. Pat. No. 6,230,522, use an offset reduction in order to adjust the apparatus and its splicing parameters to match a splicing environment, and retain unchanged the parameter set, which is then defined, for control of the next splicing process and further splicing processes. To this end, a defined distance is set between the fibers to be connected for a test splice, the fiber ends are heated, and any remaining residual offset of the connected fibers is determined. A relationship which indicates a current correction as a function of a remaining residual offset can be stored in the apparatus. These apparatus therefore require complex recording and alignment electronics as well as complex mechanical elements in order to always ensure that the optical waveguides are aligned with respect to one another as accurately as possible and as reproducibly as possible at the start of the normal splicing process. By way of example, complex positioning systems such as these use piezo elements based on piezoelectric ceramics, which allow the cores of the glass fibers to be welded to be positioned on two axes.

It is therefore desirable to nevertheless make it possible to produce a high-quality spliced connection using a splicer of the type mentioned initially, which can achieve only relatively inaccurate positioning of the ends of the optical waveguides.

SUMMARY

In one embodiment, an apparatus for thermal connection of respective ends of at least two optical waveguides has: in each case one positioning device which is associated with one of the optical waveguides and by means of which the ends are moved relative to one another to a position which allows a connection produced by the application of heat; an observation device, by means of which any relative offset of the ends of the optical waveguides to be connected is determined; a memory, by means of which a predetermined relationship is produced between a possible offset and a parameter which controls the application of heat; a thermal device by means of which the ends of the optical waveguides are connected as a function of a value which is emitted from the memory.

The apparatus accepts an initial residual offset between the optical waveguide ends to be spliced. Corresponding positioning elements can be provided for positioning of the fiber ends, which positioning elements have grooves into which the fiber ends are placed. The grooves can be fixed in position relative to one another. It is also possible to carry out a certain rough alignment of the fiber ends, with the positioning accuracy nevertheless being, for example, in the range from more than about 1 $\mu$m up to 10 $\mu$m, such that a lateral offset can be expected between the fiber ends.

The apparatus now records the offset of the external contours of the optical waveguides according to the exemplary embodiment, before the optical waveguides are welded to one another, and then determines optimum control for one or more parameters of the splicing process, on the basis of a predetermined relationship which is stored in the apparatus. By way of example, when using a splicer with an arc or corona discharge, the welding time, for example the operating time, during which the arc is active, is defined as a function of the determined offset, using the relationship stored in the apparatus. Additionally or else alternatively, the current level for supplying the arc electrodes can be adjusted.

In one embodiment, a desired attenuation which is required for the spliced connection to be produced is fixed on the apparatus, for example at the manufacturer's premises or else adjustably by the user. The apparatus then determines the optimum welding time automatically from said relationship stored in the apparatus memory and on the basis of a measured offset between the optical waveguides, before the connection process. By way of example, various relationships which are each associated with one desired attenuation to be preset are stored in the apparatus and are activated as appropriate by the manufacturer or the operator, on the basis of the preset. Different attenuations require different welding current levels, so that the temporarily stored relationships are configured on the basis of the attenuation and/or on the basis of the welding-current level. This can mean that one associated relationship of said type is stored for each given welding-current level.

The stored predetermined relationship between any possible offset between the external contours of the still unconnected optical waveguides before they have been welded and the splicing parameter, which is selected as a function of this, for example the supply current level for the heating device of the splicer, may be stored in the form of a look-up table or in the form of a calculation rule, for example a calculation formula, for instance in the form of an equation for a straight line, or some other mathematical curve. By inputting the currently measured fiber offset, it is possible to directly determine the parameter on the basis of which one of the possible stored relationships was defined, for example in advance by presetting a desired attenuation.

According to one embodiment, a method for thermal connection of respective ends of at least two optical waveguides comprises: positioning of the ends of the at least two optical waveguides relative to one another so as to allow a connection by the application of heat; recording of an image of the ends of the at least two optical waveguides; determination of any offset between the ends of the at least two optical waveguides; output of a value for a parameter from a memory, which provides a relationship between any possible offset and a parameter which influences the application of heat; operation of a heat source as a function of the value for the parameter, in order to connect the ends of the at least two optical waveguides.

BRIEF DESCRIPTION OF THE FIGURES

The disclosure will be explained in more detail in the following text with reference to one exemplary embodiment, which is illustrated in the figures of the drawing. Mutually corresponding elements in the various figures are provided with the same reference signs.

DETAILED DESCRIPTION

Figure 1:
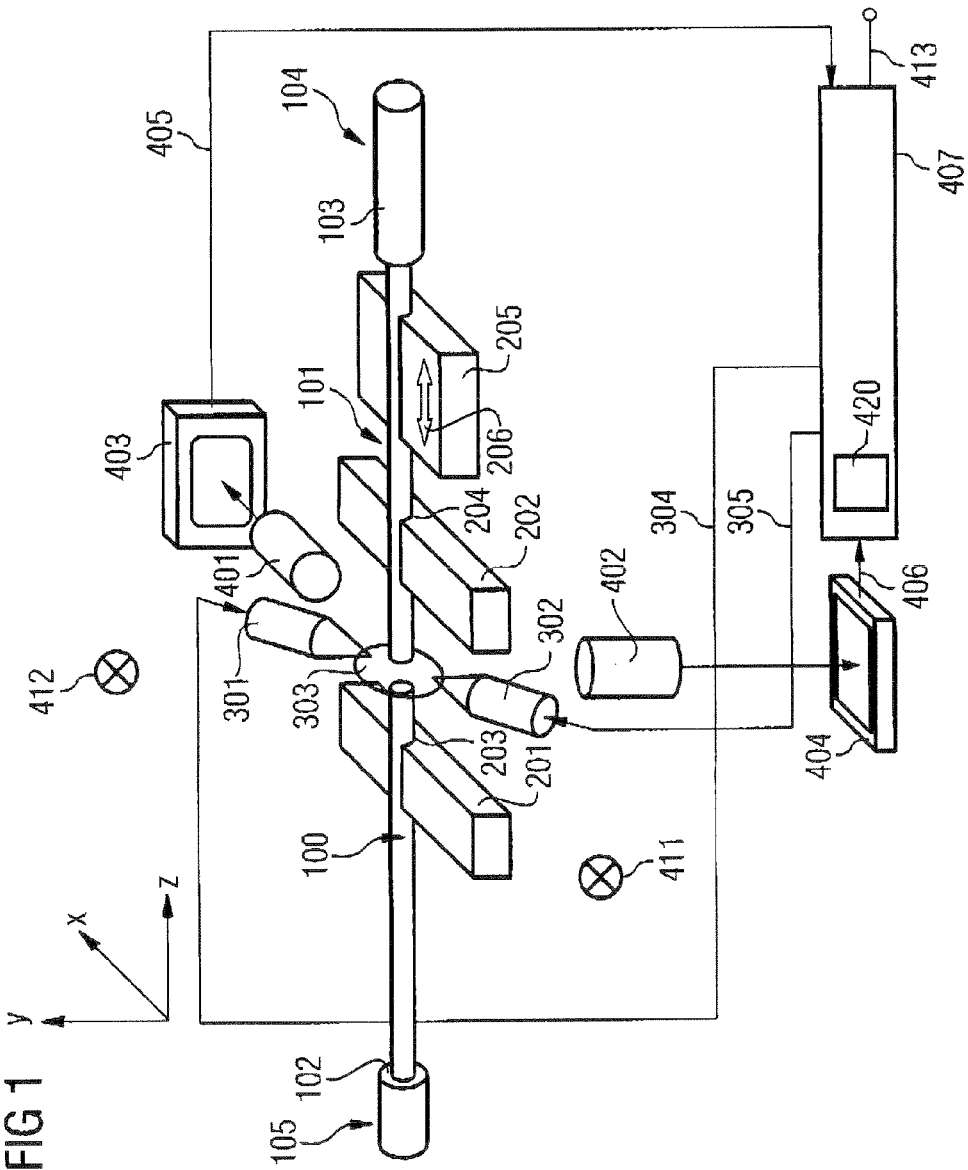
FIG. 1 shows an outline circuit diagram of major elements of a splicer according to one embodiment.
Figure 2:
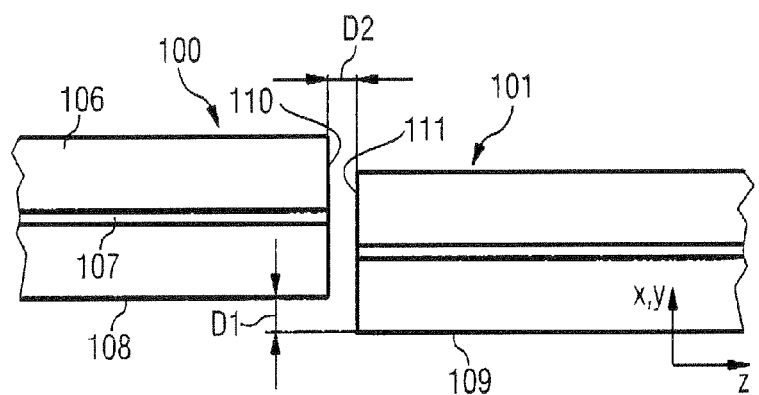
FIG. 2 shows a detailed illustration of the ends of two optical waveguides to be connected.

The splicer illustrated in FIG. 1 is used to connect the ends of two optical waveguides 100, 101, which may be optical fibers, to one another by thermal influence. A corona discharge zone or arc zone 303 is produced for this purpose, which melts the mutually opposite ends of the optical waveguides. The optical waveguides are moved toward one another and are thus connected. By way of example, the optical waveguides are glass fibers with one or more cores that carry light. The fiber end 100 originates from an optical waveguide 105 which is surrounded by a sheath 102, which has been removed at the end 100 in such a way that essentially all that is present there is the fiber core 107, which carries the light, surrounded by the glass sheath 106 with different refractive index (FIG. 2). The end of the other optical waveguide 101 is constructed in a corresponding manner. All known types of optical waveguides are suitable for use as optical waveguides, but in particular monomode fibers or NZDS fibers (non-zero-dispersion shifted fibers). The optical waveguides may be optical fibers such as glass fibers.

Positioning devices 201, 202 have respective grooves 203 and 204 in which the fiber ends are placed. The positioning elements 201, 202 and therefore the grooves 203, 204 can be fixed largely exactly in position in the apparatus in one embodiment. These grooves are then preferably aligned largely exactly with respect to one another. The V-shaped grooves may, for example, be ground in ceramics or else etched in silicon, and are thus aligned with respect to one another by the production process to within fractions of micrometers. Nevertheless, the mutually opposite surfaces 110, 111 of the fiber ends to be connected to one another may be offset with respect to one another, for example because the fibers can have a different diameter and are therefore located at a different height in the normally V-shaped groove. On the other hand, the fiber ends may be dirty, or the grooves may be contaminated with dust particles. In addition, frozen-in stresses in one of the fibers or forces exerted on the fibers by hold-down mechanisms can lead to an offset and to a position situation as illustrated in FIG. 2. Finally, it is possible for the fiber ends not to have been inserted completely exactly parallel to the groove surfaces within the groove.

There is generally also an offset between the fiber ends to be welded when the positioning elements 201, 202 are not fixed completely but can be moved relative to one another by means of a movement device which offers only a rough adjustment capability which, for example, is in the range of greater than 1 micrometer ($\mu$m). The positioning devices 201, 202 may be designed as in DE 102005038937.6, and may have an electrically powered stepping motor which produces a movement capability in the x-direction by means of a spindle or some other step-up transmission from the motor revolution. The connection comprising spindle/transmission and stepping motor currently in principle has a relatively high positioning accuracy, although this is less accurate than the positioning accuracy which can be achieved by a piezoceramic and is in the order of magnitude from about 0.06 $\mu$m to 0.1 $\mu$m. Said stepping motor mechanical elements provide a positioning accuracy of 1 $\mu$m in the lowest case, and typically from 5 to 6 $\mu$m.

The splicer in FIG. 1 now has a respective camera in the x direction and y direction, 401 and 402, by means of which the surrounding area within the corona discharge zone 303 can be recorded in the form of an image. By way of example, the cameras 401, 402 are charged coupled devices (CCD) which record an image resolved into pixels, and provide this digitally. Respective light sources 411, 412 are associated with the CCD arrays 401 and 402 and illuminate the corona discharge zone 303.

The cameras 401, 402 produce respective position images 403 and 404 which are evaluated in a control system 407 for the splicer, which control system is handled, for example, by a microprocessor. Normally, position images of the fiber ends are recorded from two different directions. In FIG. 1, these are the x-direction and the y-direction, which are at an angle of 90 degrees to one another. The directions may also include a different angle. Furthermore, it is possible to use only one camera and, by means of appropriate optics, for example mirror optics which direct light beams produced by the light sources 411, 412 at the corona discharge zone 303 such that images of the fibers ends are recorded from two different directions by said one of the cameras. For example, one of the images is recorded in one part of the camera, and the other one of the images in another part of the camera. Appropriate optics are sufficiently well known to a person skilled in the art and they will therefore not be explained in any more detail here.

The splicer also has a movement device 205 which can create a movement along the z-direction of the fibers, that is to say in the fiber longitudinal direction 206. This is necessary when the welding process is already taking place and the fused ends of the optical waveguides are pushed into one another during the welding process in order to produce a certain overlap and to compensate for material loss as a result of the heating process, or lack of glass material as a result of the end surfaces not being ideal. The positioning accuracy along the direction 206 is relatively uncritical to the accuracy.

A value for a parameter, which drives the respective electrodes 301 and 302 via couplings 304, 305 is now determined, as will be described in more detail further below, on the basis of the images 403, 404 of the fiber ends within the corona discharge zone 303, with these images being transmitted along the operative connection 405, 406 to the processor 407 of the splicer. When a corona discharge or an arc is being used to weld the fiber ends 100, 101, the amount of current, for example the time period for which the current is supplied, from the current which is supplied to the electrodes 301, 302 is controlled via the couplings 304, 305. The supplied current is converted via the corona discharge or the arc that is produced by the electrodes 301, 302 to an amount of heat which is available for welding the fiber ends. The greater the amount of heat, the better the fibers, which are offset in their positions relative to one another on the x-y plane, will be matched to one another during the welding process, because of the self-centering effect. Ideally, there is no longer any offset on completion of the welding process, or the offset is so small that a desired resultant attenuation of the light propagation in the optical waveguide is achieved, or a defined maximum attenuation is undershot. If, for example, a constant predetermined current level is set, the time period during which the current is supplied, that is to say the welding time, is controlled by the couplings 304, 305.

In principle, the optimization can be carried out in different steps. From experience, an appropriately suitable current level is required in order not to exceed a desired maximum attenuation of the spliced connection to be produced. The current level of the electrodes 301, 302 is therefore defined by defining the desired maximum attenuation at the connection 413, which the completed spliced connection should achieve or undershot. The input of the maximum attenuation at the connection 413 can be defined once in the factory, or can be defined as required by the operator of the apparatus by means of a manual input. The control information for the operative connections 304, 306 and the splicing time is then provided by the relationships stored in the control device 407, on the basis of the offset that can be determined in the images 403, 404.

In the apparatus shown in FIG. 1, the offset D1 of the external contours 108, 109 of the optical fiber ends 100, 101 is determined as illustrated with reference to FIG. 2. Since the apparatus determines the offset from two different directions, for example the x-direction and the y-direction, which are offset at an acute angle, preferably at 90 degrees to one another, a total offset, derived from this, is defined. For example, if the observation directions are offset at 90 degrees to one another, the total offset is determined by forming the root of the sum of the squares of the measured offset values associated with the x and y directions. Each image of the fiber ends recorded by a camera comprises an image of the fiber ends resolved into pixels so that, for example, the offset D1 between the external contours 108, 109 can be defined by a gray-scale evaluation and counting of pixels. During the welding process, the residual offset D1 is partially or completely compensated for by the self-centering effect of the material forces and surface forces.

In addition, it should be mentioned that the fibers also have an offset D2, which runs in the z-direction, between the end faces 110, 111 of the optical waveguides. This offset is compensated for during the welding process by the z-positioning device 205, even with an overlap of the fiber ends being produced.

Figure 3:
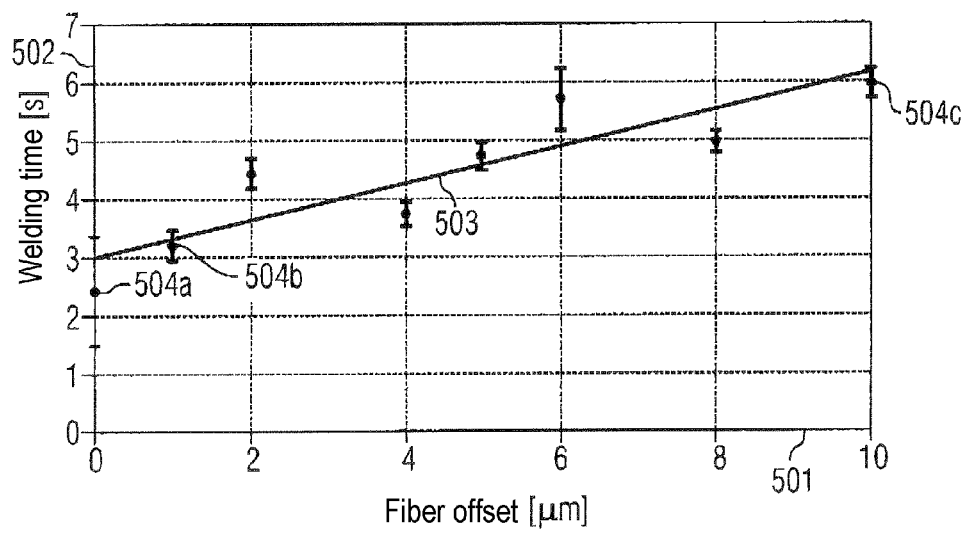
FIG. 3 shows an illustration in order to explain the relationship, stored in the apparatus in FIG. 1, between the offset and the welding time.

The relationship between the fiber offset and the welding time as stored in the control device 407 can be represented as illustrated in FIG. 3. The horizontal axis 501 represents the possible values to be expected in practice for the fiber offset, while a correspondingly associated welding time can be read from the vertical axis 502. The illustrated relationship is shown in the form of a curve, in this case a straight line 503, which was determined as a regression line on the basis of the individual measured or empirical values 504a, 504b, 504c, etc. The present fibers to be welded are, for example, fibers of the SMF 1528 type with an eccentricity of 0.1 μm, from Corning, Incorporated. The straight line 503 was determined for a welding current of 14.0 mA. This allows a certain desired attenuation of the spliced connection to be achieved or undershot. A different desired maximum intended attenuation may require a different welding current. The straight line which is associated with a different welding current such as this in general has a different vertical position and a different grading than the straight line illustrated in FIG. 3. For example, a regression line determined on the basis of the measured values for a welding current of 13.0 mA is above the straight line 503 in the graph and has a greater gradient than the straight line 503. The optimum welding time can be determined, on the basis of the fiber offset determined in any given specific case, on the basis of that straight line which is associated with the desired attenuation or the predetermined current. The fiber offset measured at any given time is used as an input value, and the welding time is determined on the basis of the straight line, and is emitted as an output value.

The illustrated straight lines are determined on the basis of initial experiments. This is done using a splicer in which a predetermined offset can be set between the fibers. The predetermined offset is set, and the integrated auto fusion time control can in this case determine the respective optimum welding time. The averaged optimum welding times which result in the lowest attenuation being achieved are associated with the corresponding offset values at intervals of 1.0 μm, as values 504a, 504b, . . . , 504c (FIG. 3). The regression line 503 is determined from this.

Figures 4, 5:
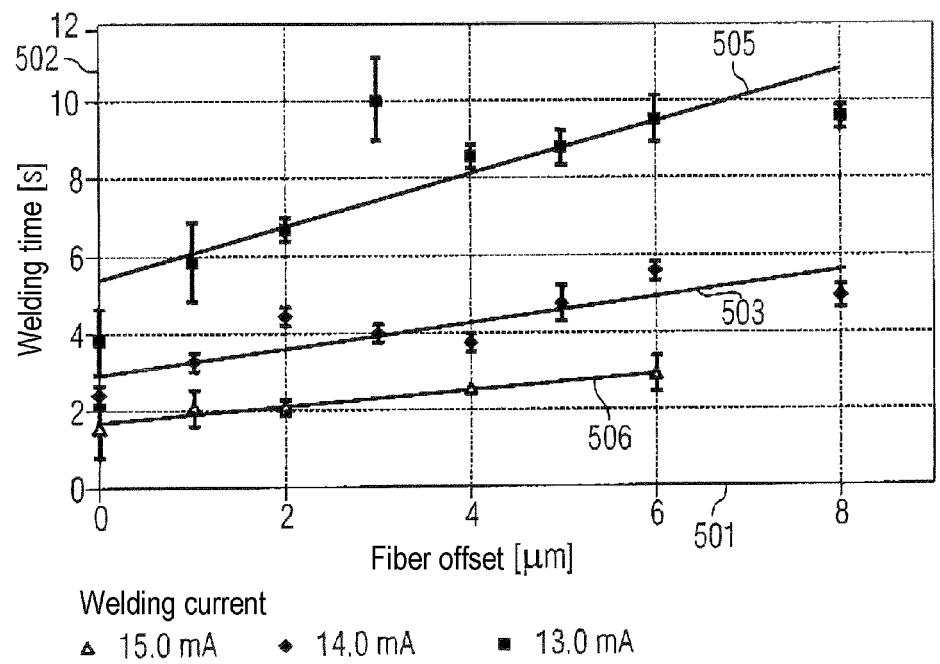
FIG. 4 shows various relationships which are provided for different welding currents.
FIG. 5 shows a representative illustration for the relationship which is stored in the apparatus shown in FIG. 1.

FIG. 4 shows various relationships for a different welding current. The straight line 503 in FIG. 4 corresponds to the straight line 503 in FIG. 3. The straight line 505 is intended for a splicing current of 13.0 mA. The straight line 506 is intended for a welding current of 15.0 mA. As can be seen, the optimum welding time of 3 seconds for a welding current of, for example, 14.0 mA is increased to about 5 seconds if the fiber offset is increased from 0 μm to 6 μm. The lengthening of the optimum welding time is greater when using a reduced welding current of 13.0 mA. The straight line 505 is therefore above the straight line 503, that is to say when using higher values for the welding time, compared with the straight line 503. A fiber offset of 6 μm results in a welding time of 9 seconds with a welding current of 13.0 mA.

In principle, a further reduction in the attenuation of the completed spliced connection can be achieved with a reduced welding current, in particular when the fiber offsets are relatively large. A further reduction in the attenuation such as this for relatively large fiber offsets is associated with the welding time being lengthened. Conversely, the use of a higher splicing current with large fiber offsets leads to greater attenuation. A specific attenuation threshold value is therefore defined in one embodiment, which is intended to be achieved for the splices. The attenuation value is entered in the apparatus via the connection 413.

The welding current must be set in an appropriate manner in order to achieve or undershoot a maximum permissible splice attenuation. For example, an attenuation is entered by the operator at the connection 413, or is permanently programmed in the factory, for one application. A suitable welding current for achieving a predetermined maximum attenuation depends on the initially found offset between the fibers. In general, it is better to use a high welding current when the offset is relatively small, and to use a lower welding current when the offset is greater. A higher welding current at the same time reduces the welding time. It is thus possible to define a specific attenuation threshold value which is intended to be achieved for all splices. If an initial offset is now determined for which the desired attenuation cannot be achieved with the currently selected welding current, a different welding current is set as appropriate, and another of the relationships illustrated in FIG. 4 is therefore chosen, and the resultant welding time is determined from this, as a result of which the predetermined maximum attenuation value is achieved or undershot. For example, this control process may comprise a high splicing current being set for low initial offset values, a medium splicing current being set for medium offset values, and a splicing current which is lower than this being set for high offset values. Summarized in a look-up table, this results in:

| Offset | Welding current |
|---|---|
| ≦5 μm | 15.0 mA |
| 6 ... 7 μm | 14.0 mA |
| ≧8 μm | 13.0 mA |

The required welding time is determined in a corresponding manner from the curves illustrated in FIGS. 3 and/or 4. In order to achieve or to undershoot a maximum predetermined attenuation, a control characteristic is used for which the splicing current to be set decreases in steps as a function of the initial offset found.

In practice, the relationship as illustrated in an idealized form in FIG. 3 is stored in the control device 407, in a memory 420 that is provided there, for example as a table as illustrated in FIG. 5. Corresponding tables (not illustrated separately) are stored in the memory 420 for the curves 505, 506 in FIG. 4. By way of example, the memory 420 contains different discrete input values 0 ... 10 with the unit being μm, each of which is associated with a respective welding time of 3.0 ... 6.2, with seconds (s) as the unit. The relationship need not necessarily be a straight line 503 as illustrated in FIG. 3. It may be a curve of any desired higher order, or a curve defined completely on the basis of empirical values. An interpolation process is required when the offset as determined from the images 403, 404 is between two stored values for the fiber offset.

As an alternative to the relationship illustrated in FIG. 5, a calculation rule can also be stored in the memory 420, in an equivalent form. In the present case, the calculation rule, which corresponds to the relationship illustrated in FIG. 5:

Welding time (in s)=0.32 s/μm×fiber offset (in μm)+ 3.0 s is used (s: seconds). Corresponding calculation rules are respectively possible for the curves 505, 506.

In the exemplary embodiment, the respective said total offset is determined from the respective images 403 and 404 recorded along the x-direction and along the y-direction, and this is used as an input variable for the relationship stored in the memory 420, where it is used either as an input value for the table (left-hand column in FIG. 5) or as an input value for the calculation rule, as a result of which a welding time can be determined from this, in seconds. The control device 407 and the couplings 304, 305 switch on the welding current at a level of, for example, 14.0 milliamperes (mA) for connection of SMF 1528 optical fiber ends to the electrodes 301, 302 during this welding time. If the initial offset found, or a value which represents the initial offset, is signaled as an input value to the memory, the welding time, or a value which represents the welding time, will be emitted from the memory, as a function of this, in the described exemplary embodiment.

The memory 420 stores a multiplicity of relationships which can be associated with different welding currents. One of these relationships is selected for the described control process as a function of the presetting of a desired welding current.

In other embodiments, a laser device, for example with a laser diode, can be used instead of the described electrodes 301, 302 in order to produce an arc or a corona discharge. A laser beam is produced and is deflected by means of optics such that it supplies thermal power to the splice point, thus allowing the fiber ends to be welded. In this situation, using a predetermined current for the laser, the operating time of the laser is determined on the basis of the relationship stored in the memory 420, using the residual offset found between the fibers to be spliced. It is also possible to use a heating filament in a so-called filament splicer, which comprises a resistance filament which produces an amount of heat which is sufficient to connect the fiber ends to one another by melting. The operating time during which the current is supplied through the heating filament in order to produce heat is likewise determined from the relationship stored in the memory 420 for the current which is defined by a predetermined attenuation. Alternatively, it is also possible to set both the current and the welding time, that is to say the time for which the current is supplied, on the basis of the relationship stored in the memory 420 and on the basis of the determined offset. In general, the invention comprises the determination of a residual offset on the basis of the images of the fiber ends recorded by the cameras 401, 402 and the determination of a parameter, which controls the application of heat in the splicing zone, in general on the basis of a relationship which is stored in the memory 420.

The described exemplary embodiment shows a pair of fibers 100, 101 which are to be connected to one another. The concepts disclosed are likewise applicable to ribbon splicers in which, instead of the individual fibers 100, 101, ends of fiber ribbons which, for example, may comprise four, six, eight or twelve pairs of fibers, are welded to one another. Appropriate evaluation methods are known for this purpose, in order to use the cameras 401, 402 to determine the offset between the ends of two fiber ribbons to be welded. In the present example, the maximum offset which occurs among all of the pairs of fibers that are respectively to be connected within the ribbons is determined in order then to determine the optimum welding time from the maximum offset value on the basis of the relationship stored in the memory 420. Alternatively, an average offset of all the offset values measured between the pairs of fibers in the two ribbons to be welded can also be used. The averaging process can be carried out by forming an arithmetic mean value, a geometric mean value or a suitably weighted mean value.

An additional attenuation reduction can be achieved by pulses. For this purpose, the arc is struck repeatedly in a pulsed form, in a process which follows the splicing process that has been described so far. The attenuation can be further improved by producing a predetermined number of current pulses for corresponding arc effects. It is important to define the optimum number of pulses, with the time interval between the pulses and the duration of the individual pulses being of secondary importance to the improvement of the attenuation. The appropriately defined number of current pulses are produced as a function of the initial fiber offset. With a fiber offset of 1.5 μm, two welding current pulses are additionally also suitable to further reduce the attenuation of the resultant spliced connection, in addition, after the welding process using the optimum welding time according to one of the curves from FIGS. 3 to 5. By way of example, three pulses are required for an initial offset of 3 μm. The pulse current is 16.0 mA, the pulse duration is 3 seconds, and the pause time duration between two pulses is 0.2 seconds, in the exemplary embodiment. This attenuation reduction method is particularly advantageous for a splice connection of so-called NZDS fibers (non-zero-dispersion shifted fibers).

The disclosure is applicable in particular to splicers in which the fiber ends are positioned with a residual offset which cannot be compensated for. The splicing process is carried out in an automated form and in this case produces an optimized spliced connection with the lowest possible attenuation.

What is claimed:

1. A method for thermally connecting respective ends of at least two optical waveguides, comprising:
   positioning of the ends of the at least two optical waveguides relative to one another so as to allow a connection by the application of heat;
   recording of images of the ends of the at least two optical waveguides, wherein the images are recorded from different directions such that each of the images records a respective distance between external contours of the ends of the at least two optical waveguides;
   determining a common offset between the ends of the at least two optical waveguides to be connected using the respective distance of each of the images;
   outputting a value for a parameter from a memory, which provides a relationship between any possible offset and a parameter which influences the application of heat;
   operation of a heat source as a function of the value for the parameter, in order to connect the ends of the at least two optical waveguides.

2. The method of claim 1, wherein a time period for the duration of the application of heat is determined from the common offset by reading from the memory, and the heat source is operated during that time period, in order to connect the ends of the at least two optical waveguides.

3. The method of claim 2, wherein a pair of electrodes is supplied with current during the time period in order to produce an arc or a corona discharge, or a laser beam is produced, or an electrical resistance heating device is supplied with current.

4. The method of claim 1, wherein a table is provided in the memory, which table specifies a relationship between any possible offset and a time period for the operation of the heat source.

5. The method of claim 4, wherein a desired attenuation to be achieved for a connection between the at least two optical waveguides is input, and one of a plurality of tables is selected as a function of the input attenuation, with each of the plurality of tables containing said relationship for a different attenuation.

6. The method of claim 1, wherein, before the common offset is determined, the ends of the at least two optical waveguides are moved in a direction transversely with respect to a longitudinal direction of the optical waveguides, with the accuracy of the movement being greater than one micrometer.

7. The method of claim 1, wherein, in order to connect the ends of the at least two optical waveguides, the ends are moved toward one another along the longitudinal direction of the optical waveguides while the heat source is being operated.

8. The method of claim 1, wherein the memory contains a calculation rule from which a time period for the operation of the heat source is calculated as a consequence of the input of the common offset.

9. The method of claim 1, wherein the ends of at least two optical waveguides comprise optical waveguide ribbons having a plurality of mutually associated pairs of ends of optical waveguides to be connected.

10. The method of claim 1, wherein the images of the ends of the at least two optical waveguides are determined from directions which differ from one another by 90 degrees.

11. The method of claim 1, wherein, following the step of operation of a heat source, the heat source is operated in a pulsed manner.

12. The method of claim 11, wherein the at least two optical waveguides are fibers of the non-zero dispersion shifted fiber type.

13. A method for thermally connecting respective ends of at least two optical waveguide ribbons, comprising:
   positioning the ends of the at least two optical waveguide ribbons relative to one another so as to allow a connection by the application of heat, wherein the ends of the at least two optical waveguide ribbons comprise a plurality of mutually associated pairs of ends of optical waveguides positioned relative to one another;
   recording of an image of the ends of the at least two optical waveguide ribbons;
   determining respective offset values between the plurality of mutually associated pairs of ends of optical waveguides;
   forming a common offset by combining the respective offset values, wherein the common offset is formed by averaging or selecting an extreme value of the respective offset values;
   inputting the common offset to a memory;

outputting a value for a parameter from the memory, which provides a relationship between any possible offset and a parameter which influences the application of heat; and operating a heat source as a function of the value for the parameter, in order to connect the ends of the at least two optical waveguide ribbons.

14. A method for thermally connecting respective ends of at least two optical waveguides, comprising:

positioning of the ends of the at least two optical waveguides relative to one another so as to allow a connection by the application of heat;

recording of an image of the ends of the at least two optical waveguides;

determining an offset between the ends of the at least two optical waveguides to be connected;

outputting a value for a parameter from a memory, which provides a relationship between any possible offset and a parameter which influences the application of heat;

operation of a heat source as a function of the value for the parameter, in order to connect the ends of the at least two optical waveguides, wherein, following the step of operation of a heat source, the heat source is operated in a pulsed manner, and wherein the number of pulses is defined as a function of the determined offset, and comprises two or three pulses.

* * * * *